United States Patent
Koch et al.

(10) Patent No.: US 11,380,094 B2
(45) Date of Patent: Jul. 5, 2022

(54) SYSTEMS AND METHODS FOR APPLIED MACHINE COGNITION

(71) Applicant: AT&T Intellectual Property I, L.P., Atlanta, GA (US)

(72) Inventors: Robert Koch, Peachtree Corners, GA (US); Nikhil Marathe, Palatine, IL (US); James Pratt, Round Rock, TX (US); Ari Craine, Marietta, GA (US); Eric Zavesky, Austin, TX (US); Timothy Innes, Atlanta, GA (US); Nigel Bradley, Canton, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/712,274

(22) Filed: Dec. 12, 2019

(65) Prior Publication Data

US 2021/0182557 A1 Jun. 17, 2021

(51) Int. Cl.
*G06K 9/00* (2022.01)
*G06V 20/20* (2022.01)
*H04L 51/52* (2022.01)
*H04B 1/3827* (2015.01)

(52) U.S. Cl.
CPC ............ *G06V 20/20* (2022.01); *H04L 51/32* (2013.01); *H04B 1/3827* (2013.01)

(58) Field of Classification Search
CPC .................................................. G06K 9/00671
See application file for complete search history.

(56) References Cited

U.S. PATENT DOCUMENTS

| | | |
|---|---|---|
| 5,072,998 A | 12/1991 | Oh |
| 5,982,390 A | 11/1999 | Stoneking et al. |
| 6,230,111 B1 * | 5/2001 | Mizokawa ............ G06N 3/004 345/473 |
| 6,526,395 B1 | 2/2003 | Morris |
| H2253 H | 5/2011 | Petrovic et al. |
| 8,285,549 B2 | 10/2012 | Teegan et al. |
| 8,898,233 B2 | 11/2014 | Ganetakos et al. |
| 8,996,429 B1 | 3/2015 | Francis et al. |
| 9,489,679 B2 | 11/2016 | Mays |

(Continued)

FOREIGN PATENT DOCUMENTS

| | | |
|---|---|---|
| WO | WO 2003/096171 A1 | 11/2003 |
| WO | WO 2008/000044 A1 | 1/2008 |
| WO | WO 2019/124850 A1 | 6/2019 |

OTHER PUBLICATIONS

Esch et al.; "Anthropomorphism and augmented reality in the retail environment"; Journal of Retailing and Consumer Services; vol. 49; 2019; p. 35-42.

(Continued)

*Primary Examiner* — Ryan R Yang
(74) *Attorney, Agent, or Firm* — Guntin & Gust, PLC; John G. Rauch (57) ABSTRACT

A server may assign human personality traits to inanimate objects. In an example, a server may effectuate operations that include obtaining information about an object over a period; comparing the information to usage factors, interaction factors, or environmental factors that are linked to thresholds for a personality; based on the comparing, assigning the personality to the object; and based on the personality of the object, assigning an avatar to the object.

20 Claims, 4 Drawing Sheets

(56) References Cited

U.S. PATENT DOCUMENTS

| | | |
|---|---|---|
| 9,996,874 B2 | 6/2018 | Yopp et al. |
| 10,061,468 B2 | 8/2018 | Lundin et al. |
| 10,148,789 B2 | 12/2018 | Gibson et al. |
| 10,210,425 B2 | 2/2019 | Caldwell |
| 10,228,773 B2 | 3/2019 | Lyons |
| 2002/0005787 A1 | 1/2002 | Gabai et al. |
| 2003/0004774 A1* | 1/2003 | Greene .................. H04L 67/16 705/7.14 |
| 2006/0282315 A1 | 12/2006 | Brennan |
| 2007/0265090 A1* | 11/2007 | Barsness ................. A63F 13/61 463/42 |
| 2011/0212428 A1 | 9/2011 | Baker |
| 2012/0176525 A1* | 7/2012 | Garin .................... G01C 21/20 348/333.02 |
| 2013/0123583 A1* | 5/2013 | Hill ...................... G06F 16/284 600/300 |
| 2013/0260850 A1 | 10/2013 | Carpe et al. |
| 2014/0279288 A1* | 9/2014 | Wouk ................. G06Q 30/0643 705/27.2 |
| 2016/0343168 A1* | 11/2016 | Mullins .................... G06F 3/015 |
| 2017/0372236 A1* | 12/2017 | Iwanami ................. G06F 16/29 |
| 2019/0143527 A1 | 5/2019 | Favis et al. |
| 2019/0173826 A1* | 6/2019 | DeLuca .............. G06Q 10/107 |
| 2019/0197177 A1 | 6/2019 | Bielby |
| 2019/0205727 A1* | 7/2019 | Lin ........................ G06N 20/00 |
| 2020/0184218 A1* | 6/2020 | Cheng .................. G02B 27/017 |

OTHER PUBLICATIONS

Michael Schmitz; "Interacting with Anthropomorphized Smart Objects"; Jun. 2005; 4 pages.

Schmitz et al.; "Towards Anthropomorphized Objects: A Novel Interaction Metaphor for Instrumented Spaces"; $3^{rd}$ Int'l Workshop on the Tangible Space Initiative; 2006; 6 pages.

* cited by examiner

SYSTEMS AND METHODS FOR APPLIED MACHINE COGNITION

BACKGROUND

An inanimate object may be considered a thing that is not alive, such as a rock, a chair, or a book. This definition can be expanded to include that an inanimate object may lack any sign of life or consciousness. The internet of things is rapidly emerging and accelerating the integration of inanimate objects into everyday life. This disclosure is directed to addressing issues in the existing technology.

This background information is provided to reveal information believed by the applicant to be of possible relevance. No admission is necessarily intended, nor should be construed, that any of the preceding information constitutes prior art.

SUMMARY

There are a number of factors that may be used to describe how an object operates or is used. When the object has capabilities for electronic communications over a network and the ability to store and process electronic data, these factors may be determined and recorded and, over time, may be used to create a set of electronically stored data that represents a "personality" of the object. Disclosed herein are methods, systems, and apparatuses for applied machine cognition which may include assigning, modifying, or otherwise using human personality traits for inanimate objects.

In an example, an apparatus may include a processor and a memory coupled with the processor that effectuates operations. The operations may include obtaining information about an object over a period; comparing the information to usage factors, interaction factors, or environmental factors that are linked to thresholds for a personality; based on the comparing, assigning the personality to the object; and based on the personality of the object, assigning an avatar to the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Conventionally, personality is often broken into statistically-identified components. These components may be stable over time, and about half of the variance may be attributable to a person's genetics and the other half based on effects of one's environment. With this context in mind, as disclosed herein, an inanimate object may have a personality reflected in a similar way, in which a first percentage (e.g., 40%) of the inanimate object's personality may be attributable to the inanimate object's model or make (e.g., default configuration by manufacturer or seller) and a second amount of the inanimate object's personality may be attributable to external factors (e.g., usage factors, interaction factors, environment factors, etc.).

There are a number of factors that may be used to describe how an object operates or is used. When the object has capabilities for electronic communications over a network and the ability to store and process electronic data, these factors may be determined and recorded and, over time, may be used to create a set of electronically stored data that represents a "personality" of the object. Disclosed herein are methods, systems, and apparatuses for assigning, modifying, or otherwise using human personality traits for objects.

Figure 1:
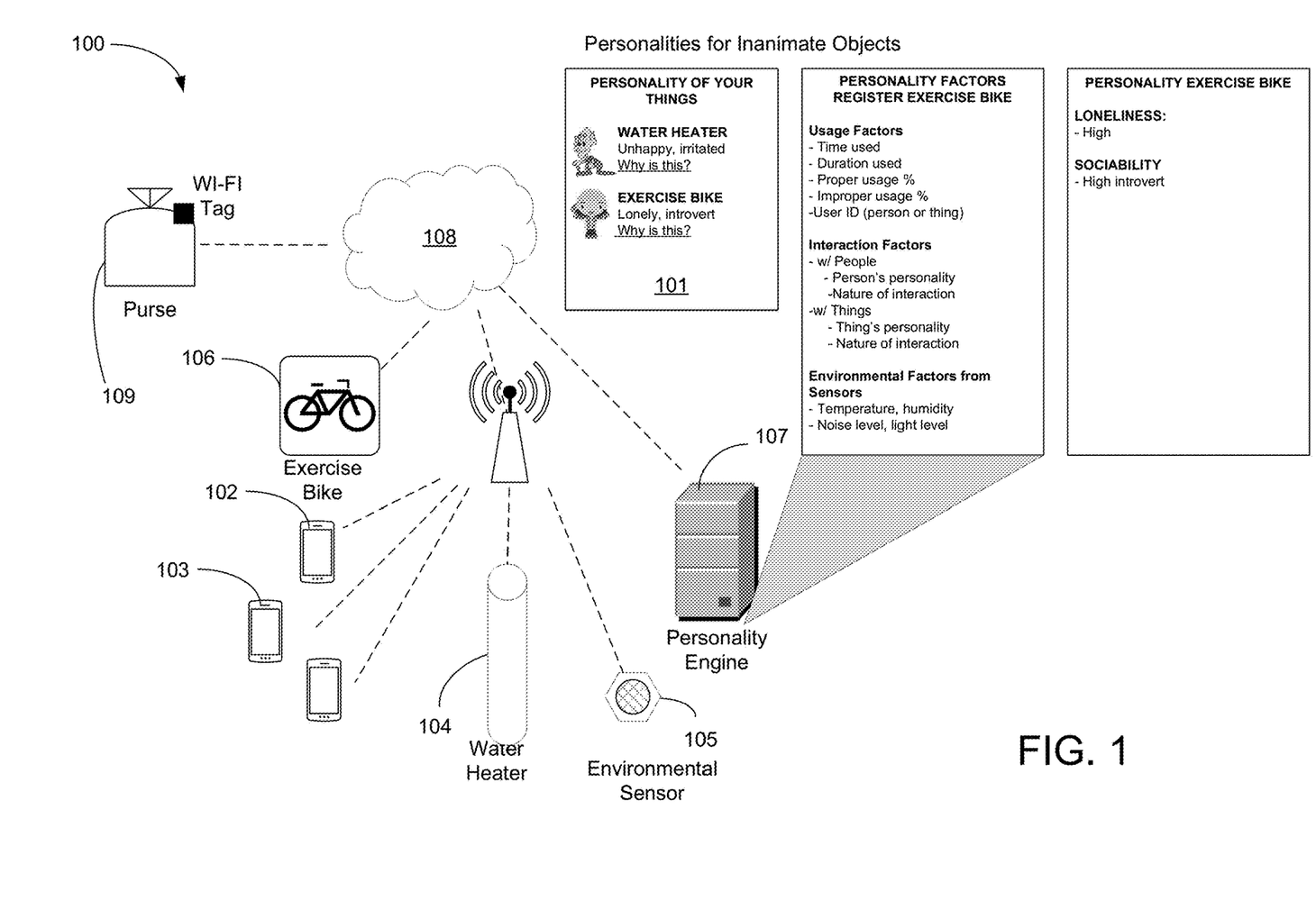
FIG. 1 illustrates an exemplary system associated with Systems and Methods for Applied Machine Cognition.

FIG. 1 illustrates an exemplary system associated with systems and methods for applied machine cognition (also referred herein as objects). System 100 may include multiple inanimate objects (also referred herein as objects), such as mobile device 101, mobile device 102, mobile device 103, appliance 104, sensor 105, bike 106 (e.g., stationary bicycle with integrated computing technology), purse 109, or server 107 that may be communicatively connected with each other, using wireless or wireline, via network 108. Server 107 may include a personality engine that may process the object information as disclosed in more detail herein. Mobile device 101, mobile device 102, or mobile device 103 may include, wireless devices, such as satellite communication systems, portable digital assistants (PDAs), laptop computers, tablet devices, smart phones, smart watches, smart speakers, automobiles (e.g., autonomous vehicles), augmented reality devices, virtual reality devices, or the like. Appliance 104 may include ranges, wall ovens, refrigerators, dishwashers, washing machines, dryers, smart bulbs, or coffee makers. Sensor 105 may include an environmental sensor, acoustic sensor, sound sensor, vibration sensor, fluid sensor, optical sensor, position sensor (e.g., accelerometer or gyroscope), speed sensor, chemical sensor, pressure sensor, or the like. Sensor 105 may be substantially integrated into a device (e.g., appliance 104 or purse 109) or may be a stand-alone device.

Figure 2:
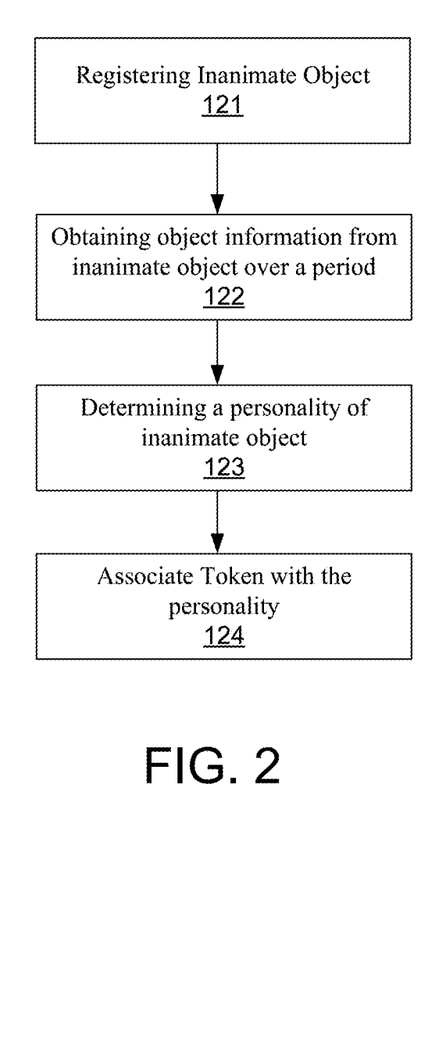
FIG. 2 illustrates an exemplary method associated with Systems and Methods for Applied Machine Cognition.

FIG. 2 illustrates an exemplary method associated with systems and methods for applied machine cognition. At step 121, appliance 104 (i.e., an inanimate object) may be registered with server 107. During the registration process a profile may be created. The profile may include descriptive information about appliance 104 that is collected by server 107. The descriptive information may include manufacturer, date of manufacture, object identifier (e.g., alphanumeric), date of first use in service at any location, date of first use of service at a particular location, initial geographical coordinate position, position in or around a facility (e.g., home or business facility), general time of use, time of use in different modes (e.g., color cycle or whites cycle for a washer), features, photo of the appliance 104, or the like.

In addition to the descriptive information, the profile may include information associated with display features or audio features for appliance 104. Display features may include avatars or alert formatting, among other things. Audio features may include assigned voices for an avatar or appliance 104, assigned audio for an alert, or the like. The profile for appliance 104 may include other features, such as alert triggers (e.g., alert based on proximity of mobile device 101 to appliance 104), social media features (e.g., automatically posting status to social media), or linking to a group or other outside entities (e.g., appliance linked to other internal or external appliances), among other things.

One or more avatars may be selected for appliance 104. There may be avatars that are representative of each human personality or human mood, which is described in more detail below. In a first scenario, a profile may have a different avatar (e.g., different persons) with different facial structure (e.g., hairstyle, age, gender, ethnicity) for each mood (e.g., cheerful, amused, blissful, calm, cheerful, content, energetic, etc.). In a second scenario, a profile may have the same avatar for each mood, in which the facial structure may be primarily the same (e.g., same person), but with different styling (e.g., hair or clothing) or facial expressions (e.g., smile or frown). Personalities may be considered long term and may change more gradually than mood, although there may be some overlap. Personality tests (e.g., Myers Briggs) may help determine types of personalities that may be based on multiple preferences, such as extraversion, introversion, intuition, sensing, thinking, feeling, judgment, or perception. Although the term personality will be used herein, it is contemplated herein that mood may be included in the term personality, unless otherwise provided.

With continued reference to step 121 of FIG. 2, object information associated with appliance 104 may be linked to one or more personalities of appliance 104. Object information may include descriptive information, usage factors (e.g., how the product is used), interaction factors (e.g., what the object communicates with), or environmental factors (e.g., data describing the environment in which the object operates), among other things. Server 107 may link the object information to different thresholds that correspond to different personalities, which may be scaled (e.g., high or medium happiness). The different personalities may also be linked to different avatars or other physical or virtual display output. Example object information is listed in Table 1.

TABLE 1

| Usage Factors | Interaction Factors | Environmental Factors |
| --- | --- | --- |
| Time Used | Person Personality | Temperature |
| Duration Used | Nature of Interaction with Person | Humidity |
| Proper Usage Percentage | Other Object Personality | Noise |
| Improper Usage Percentage | Nature of Interaction with Other Object | Motion |
| Identifier of Other Object that is Using | | Light |
| Identifier of Person that is Using | | |

With continued reference to FIG. 2, at step 122, server 107 may obtain (e.g., receive) object information from appliance 104 over a period. As an example, appliance 104 (e.g., a water heater in a home) may record object information, such as events that it detects during its operation, and report the object information to server 107. The object information may be collected over a period. The object information may be reported by appliance 104 or sensors associated with sensor 105. For example, sensor 105 may report motion or noise. Sensor 105 may be a camera that detects motion, noise, interactions, or the like. The use of a camera may be helpful when appliance 104 is not communicatively connected with server 107, but sensor 105 has the ability to provide some or all of the object information to server 107. The camera may record video of the object or environment proximate to the object (based on line of sight) and the video and other object information may be provided to server 107. It is contemplated that similar to facial recognition, video, audio, or photo recognition of an object may be used to identify object information as disclosed herein.

When appliance 104 sends the object information to server 107, it may include usage factors data, such as a time period, an energy efficiency rating for the time period, amount of energy used, or volume of water used, among other things. The object information may also include interaction factors data, such as user IDs (e.g., of the people or object) detected in the home during the time period. This may be via detection of personal electronic devices of the people present in the home (e.g., mobile device 101) or other sensors 105 (e.g., a camera). The object information may also include environmental factors data, such as data collected from sensors (e.g., temperature or humidity sensors on or near appliance 104).

With continued reference to FIG. 2, at step 123, based on object information (e.g., information of step 122), determining a personality of appliance 104. For example, server 107 may translate the usage factors data, interaction factors data, environmental factors data, or other object information into scores on a personality scale. This personality scale (e.g., a Myers Briggs-like model) may include various human personality traits, such as agreeableness, happiness, loneliness, extraversion, comfort, or integrity. The object information may be used to determine where appliance 104 rates on a measured scale for these traits. In an example, based on thresholds for object information of Table 1, a personality as shown in Table 2 may be created for a period (e.g., current period). As time passes, default personalities may be predicted based on the object information, such as shown in Table 3.

TABLE 2

| Comfort | Happiness | Irritation |
| --- | --- | --- |
| Low | Low | High |

TABLE 3

| Comfort | Happiness | Irritation |
| --- | --- | --- |
| Fall and Winter: Highly Comfortable | Summer: Low when John is Home | Irritation: High |
| Spring: Moderately Comfortable | Other: High | |
| Summer: Uncomfortable | | |

For instance, server 107 might process object information to determine that during the summer, appliance 104 runs in a hot and humid environment and appliance 104 also detects that this is when Susie is home from college (e.g., mobile device 102) and takes long showers. Therefore, appliance 104 may be represented by default with a personality of unhappy and uncomfortable during the summer. This summer personality information may change over the course of the summer based on the object information gathered over time. Moreover, the interactions of appliance 104 with other products or things may affect its personality representation. For instance, appliance 104 (e.g., the water heater) may be old or running an old software version. Based on its age (e.g., lack of features), appliance 104 may be unable to implement energy efficient updated operating instructions that it receives, from mobile device 103, which is an interaction with another thing. If appliance 104 constantly receives messages with regard to do something (implementing the operating instructions) that it cannot, appliance 104 may "feel" irritated. This irritated personality may be associated with a threshold time frame that the updated operating instructions were received and a threshold number of messages associated with the updated operating instructions.

With continued reference to step 123 of FIG. 2, a personality scale may use a well-known human personality model to identify and assign the personality of appliance 104. Other information such as the age of appliance 104 or a history of location of appliance 104 might be used to further the personality representation of appliance 104.

At step 124, based on the determined personality of step 123, an action may be taken associated with the personality. An example action is appliance 104 may be assigned an avatar whose personality is representative of the data. For example, if the personality corresponds to Table 2, then an avatar that resembled a grumpy man or woman may be assigned. From there, this personality representation may be presented on a display on mobile device 101 (e.g., a smartphone or augmented reality device) to a user along with a link to additional information that may summarize significant object information that contributes to the determined personality representation. Significant object information (e.g., top 3 factors) may include usage factors data, interaction factors data, or environmental factors data.

In another example, appliance 104 may be assigned a voice type to be used for text-to-speech communications. The voice may already be associated with the avatar or separately assigned. The voice assigned to appliance 104 might, for example, be a grumpy old man or irritated toddler and may be used when reporting a requested status of appliance 104. The status may be requested via mobile device 101 (e.g., smart speaker, smartphone, augmented reality goggles, etc.).

In another example action, a social media post associated with the personality of appliance 104 may be automatically posted. If appliance 104 is particularly happy for an extended period of time (e.g., a threshold amount), then a social media post may show an avatar or meme that is indicative of the happy personality. In another example, appliance 104 may initiate a communication with the user of mobile device 101. A dishwasher may call (or otherwise alert) mobile device 101 to tell the user that it was not turned on by co-opting human communication channels (e.g., a phone or video chat).

Another example action may be an increase or decrease in the number of alerts or other interactions with regard to appliance 104, because of the personality of appliance 104. If appliance 104 is determined to have an introvert personality then less proactive alerts may be provided about appliance 104's status. If appliance 104 is an extrovert, then more proactive alerts may be provided. The proximity of a user may determine whether an alert is sent or not. If the user is proximate (e.g., near) appliance 104, an alert may be sent.

There are multiple scenarios that personalities for inanimate object may be used. Additional examples and perspective are disclosed below.

In a scenario, appliance 104 may be relatively old and out of date. Appliance 104 may receive instructions on energy efficiency operation from a home network, but fail to implement them. Based on an assigned personality, appliance 104 may be represented as an avatar (or meme) indicative of "Old Dog Not Able to Learn New Tricks." In another example, appliance 104 may have connected with a large number of Wi-Fi networks in different countries. Based on an assigned personality, appliance 104 may be represented as an avatar (or meme) indicative of a "World Traveler that is Open to New Connections." In another example, an avatar associated with appliance 104 may be have an age progression or facial change based on time or amount of use.

In a scenario an inanimate object may be a bike 106 (e.g., connected exercise bike). In this case, object information might indicate bike 106 is used only once per month on average and is relatively new. Also, object information may indicate that other exercise bikes may have tried to invite bike 106 (e.g., associated with other end users) to participate in group exercise sessions, but bike 106 has not replied. In this case, bike 106 may have a personality associated with a young, lonely introvert. Bike 106 may send an alert to ask the user if it should list itself for sale online or automatically list itself for sale, which may be via social media.

In another scenario an inanimate object may be a security camera (e.g., sensor 105) and may have an avatar that is indicative of a professional police officer. The avatar may be based on sensor 105 regularly (e.g., every week or every month) sending video clips to a local police department that has been indicated as useful and high quality.

There may be a default personality (e.g., preinstalled personality) and accompanying avatar that a manufacturer or seller of an inanimate object may associate with the inanimate object. The default personality may be representative of a company or product. For example, a certain model bike 106 may be considered an introvert until it adds one or more features (e.g., physical or digital) to bike 106, such as a designated handle bar or a designated genre of music. In another example, a car may come with a pre-installed personality, which may change over time based on object information associated with how a user drives the car. The object information may include high speeds, sudden stops, or the number of yellow lights run, among other things.

Usage factors or other object information may be associated with more than one user to create an aggregate personality that reflects shared usage. For instance, a home may be represented based on aggregate interactions of multiple users (e.g., persons or other inanimate objects) with many of the inanimate objects within the home. A personality may be transferred from one thing to another. For instance, when buying a new car, the previous car's personality may be transplanted into it.

An inanimate object may have a personality that changes over time and have a corresponding avatar that changes its appearance based on its current personality. For instance, purse 109 may be associated with a user and may be connected with network 108 (e.g., an integrated mobile device or a smartphone that has a virtual assistant application running on it). The purse may detect interaction with other users via a virtual assistant application that uses speech recognition. For instance, if the virtual assistant application detects speech around it that is complimentary of the purse, it may collect this as object information (e.g., interaction factor data) and send it to server 107. Server 107 may note this as a trend in increasing confidence for purse 109. Based on the object information, purse 109 may change its appearance to illuminate lights, electronically change the visual appearance of the fabric of purse 109 (e.g., electrical stimulus that changes temperature and color of the fabric), or make other changes.

In another scenario, the user may train the inanimate object personality via a speech interface (e.g., a virtual assistant). For instance, if the bike 106 is communicating that it is lonely, the user may "reassure it" by scheduling a workout time on an electronic calendar. Based on this interaction the personality of bike 106 may change and actions may be taken in response to such personality change, as disclosed herein. In a similar scenario, an electronic calendar may include events that are associated with an inanimate object. For example, there may be a calendar event to run in the morning each day. If the calendar event is not performed at all or below a threshold, then a user's shoes may be assigned a personality of loneliness or irritation. Subsequently an alert may be provided to a display technology (e.g., augmented reality) that shows a message, a change in avatar appear or voice, or the like. Other events connected with inanimate object are contemplated such as riding bike 106, washing car, washing clothes, cleaning home, reading a book, or cooking (e.g., stove may be the inanimate object), among other things.

In another scenario, server 107 might detect that an inanimate object (e.g., mobile device 103) is being misused. For instance, via an imbedded accelerometer in mobile device 103, an impact by mobile device 103 may be indicated as mobile device 103 being slammed. Based on this detection, mobile device 103 may actively participate in its own self-preservation and a personality indicative of despair (e.g., an emergency) may be assigned. Based on the personality an action may be taken such as reporting the misuse to an appropriate entity. In another example, misuse may be an attempted software hack that the mobile device 103 detects upon itself, or a detection that the personalities of other things that it interacts (and shares data with} are of low integrity.

In another scenario, augmented reality or virtual reality goggles may be used. For example, a person may be able to walk around their home or business and easily understand the personality (or mood) of the inanimate objects and quickly address any issues that may provide a real-world performance change in the object or some other significant, but less direct benefit. For example, based on the personality of the inanimate object, a real-world change such as tightening a screw, releasing a valve, or reducing usage may be performed. This may positively affect the performance of the inanimate object. With regard to an indirect benefit to performance, in an example, an inanimate object may have a personality comprising loneliness which could be easily observed using augmented reality. Based on recognition of this loneliness personality by a person (or another inanimate object) a book may be picked up, a couch may be sat on, or rarely used bike 106 may be used to decrease the loneliness of the inanimate object, but not necessarily increase or decrease the performance of the inanimate object directly. A change may be made in the personality data, but also a change may be made in the person's daily habits, individual performance, or upkeep of a home. The indirect benefit may assist in discovering possibly forgotten inanimate objects in the home, which may cause for more efficient use of the home, keeping a person more physically fit, or efficient use of the person's resources, such as automatically posting the book for sale online or reading it for the first time and not purchasing another book to read. In another example, an inanimate object (e.g., a smartphone) may have a personality that indicates it is spoiled (e.g., grandiose or narcissistic), when it consistently overused.

It is contemplated that one or more devices may participate in the methods disclosed herein. Some steps may be distributed over a plurality of devices, such as server 107, mobile device 101, appliance 104, sensor 105, or bike 106. It is also contemplated that the actions, object information, or the like may be displayed on a mobile phone screen, computer screen, virtual reality screen, or augmented reality screen (glasses or mobile phone), among other display technologies.

Conventionally, personality is often broken into statistically-identified components. These components are generally stable over time, and about half of the variance may be attributable to a person's genetics and the other half based on effects of one's environment. With this context in mind, the disclosed subject matter may be reflected in a similar way with an inanimate object, in which a first amount (e.g., half) of the inanimate object's personality may be attributable to the inanimate object's model or make (e.g., default configuration by manufacturer or seller) and a second amount of the inanimate object's personality may be attributable to external factors (e.g., usage factors, interaction factors, environment factors, etc.).

Disclosed herein are methods, systems, and apparatuses for assigning, modifying, or otherwise using personality traits for inanimate objects. This allows for the users of these objects to make efficient use of these objects and tailor them to be used in such a way that efficiently meets their needs.

Figure 3:
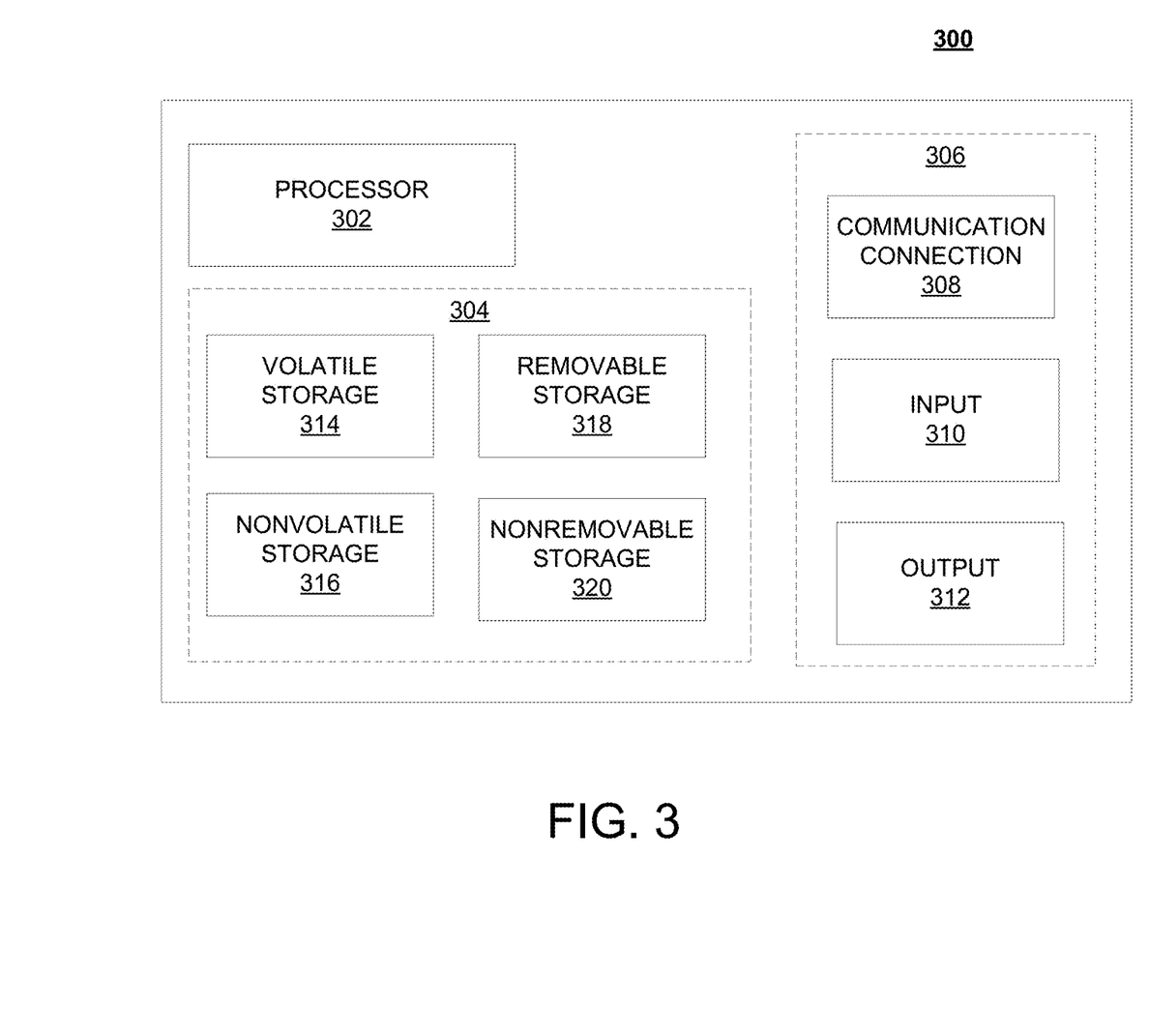
FIG. 3 illustrates a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
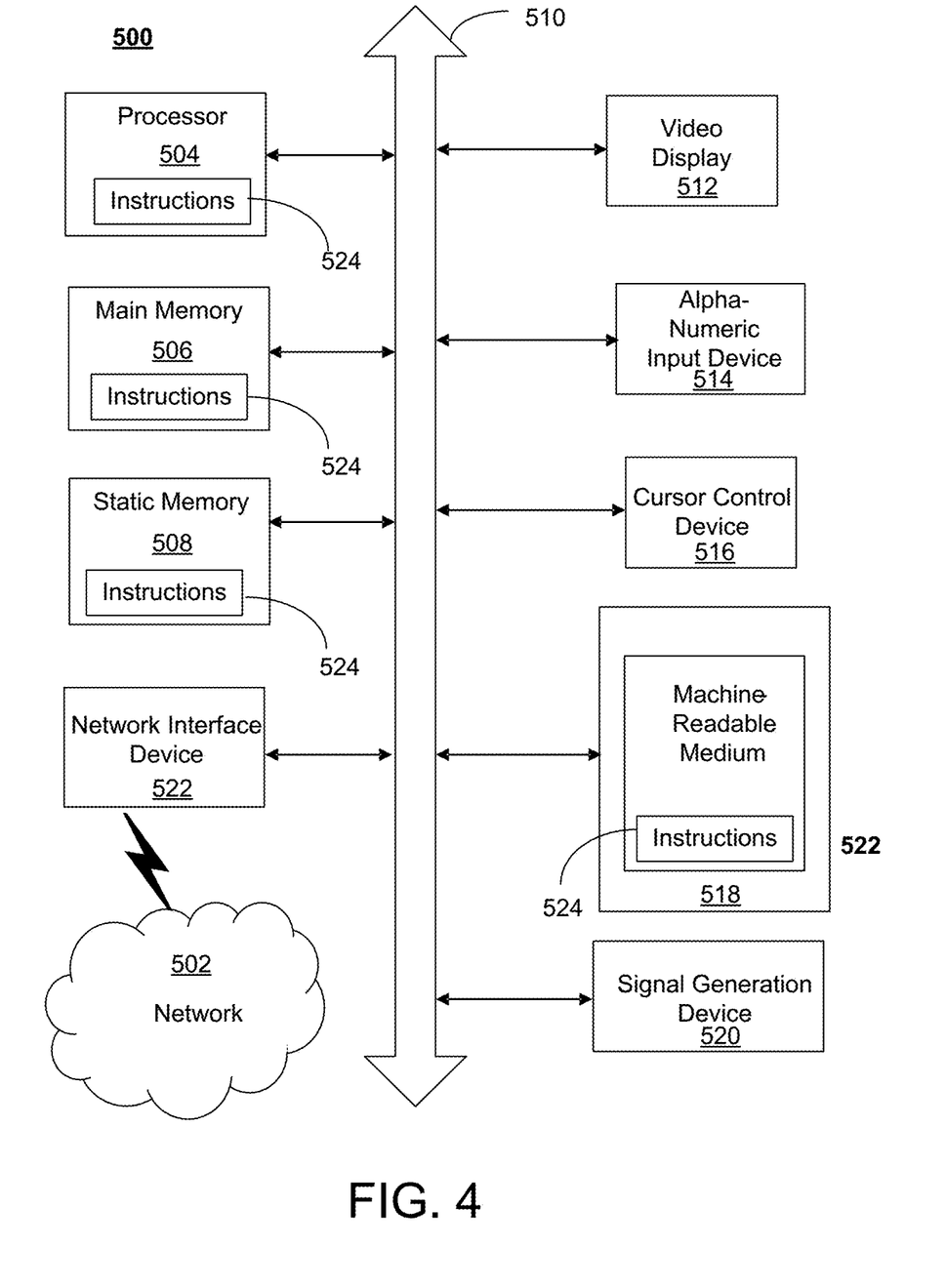
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 101, mobile device 102, mobile device 103, appliance 104, sensor 105, and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

While examples of a telecommunications system in which systems and methods for applied machine cognition can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—systems and methods for applied machine cognition—as illustrated in the Figures, specific terminology is employed for the sake of clarity. The claimed subject matter, however, is not intended to be limited to the specific terminology so selected, and it is to be understood that each specific element includes all technical equivalents. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples (e.g., skipping steps, combining steps, or adding steps between exemplary methods) are contemplated herein. Such other examples are intended to be within the scope of the claims if they have structural elements that do not differ from the literal language of the claims, or if they include equivalent structural elements with insubstantial differences from the literal languages of the claims. An inanimate object is considered anything that lacks consciousness (e.g., a lawn or an apple). With that said, it is contemplated herein that the techniques used for inanimate objects may be used to assign personalities to people (e.g., through observing activities through a camera and a mobile device of the person).

Methods, systems, and apparatuses, among other things, as described herein may provide for obtaining first information about an object over a first period; based on the obtaining the first information about the object, assigning a first avatar to the object; obtaining second information about the object over a second period; and based on the obtaining the second information about the object, assigning a second avatar to the object. Methods, systems, and apparatuses, among other things, as described herein may provide for obtaining first information about an object over a first period; comparing the first information to usage factors, interaction factors, or environmental factors that are linked to thresholds for a personality; based on the comparing, assigning the personality to the object; and based on the personality of the object, assigning an avatar to the object. An apparatus may assign a personality to the object. The assigning the personality to the object may comprise assigning an avatar to the object, and the operations further comprising providing instructions to display the avatar via augmented reality The method, system, computer readable storage medium, or apparatus may, based on the personality of the object, assign audio to the object; automatically post information associated with the personality of the object to social media; send a request to post information about the object to social media; send a reduced number of alerts associated with the object when the personality is introversion; or display the avatar via augmented reality. The method, system, computer readable storage medium, or apparatus may, based on the personality of the object, assign audio to the object. The first information about the object over the first period may be from a camera in proximity. The method, system, computer readable storage medium, or apparatus obtaining first information about an object over a first period; comparing the first information to usage factors, interaction factors, or environmental factors that define personalities; and based on the comparing, assigning a personality to the object. The method, system, computer readable storage medium, or apparatus automatically posting information (e.g., social media, SMS text, web page, or other alert for display) associated with the personality of the object. All combinations in this paragraph (including the removal or addition of steps) are contemplated in a manner that is consistent with the other portions of the detailed description.

What is claimed:

1. An apparatus comprising:
   a processor; and
   a memory coupled with the processor, the memory storing executable instructions that when executed by the processor cause the processor to effectuate operations comprising:
     obtaining first information about an object over a first period wherein the first information comprises information generated by the object, wherein the first information is obtained from the object, the first information comprising information about events detected by the object during operation of the object, the first information comprising information about usage of the object or information about usage of resources by the object;

obtaining second information about the object over the first period, wherein the second information comprises interactions of the object with one or more additional inanimate objects, wherein the second information comprises information about an object personality of a particular object of the one or more additional inanimate objects with which the object interacts;

obtaining third information about the object over the first period, wherein the third information is generated by a sensor in proximity to the object;

comparing the first information to usage factors;

comparing the second information to interaction factors;

comparing the third information to environmental factors;

based on the comparing, scoring the first information, second information and third information on a personality scale; and assigning a personality to the object, based on the scoring.

2. The apparatus of claim 1, wherein assigning the personality to the object comprises assigning an avatar to the object, and the operations further comprising providing instructions to display the avatar via augmented reality.

3. The apparatus of claim 1, the operations further comprising based on the personality of the object, automatically posting information associated with the personality of the object.

4. The apparatus of claim 1, the operations further comprising based on the personality of the object, sending a request to post information about the object to social media.

5. The apparatus of claim 1, wherein the personality comprises introversion; and based on the personality, sending a reduced number of alerts associated with the object.

6. The apparatus of claim 1, the operations further comprising based on the personality of the object, assigning audio to the object.

7. The apparatus of claim 1, wherein the first information about the object over the first period is from a camera in proximity.

8. A computer readable storage medium storing computer executable instructions that when executed by a computing device cause said computing device to effectuate operations comprising:

obtaining first information about an object over a first period wherein the first information comprises information generated by the object the first information comprising information about a usage of the object or information about usage of resources by the object during a usage of the object;

obtaining second information about the object over the first period, wherein the second information comprises information about interactions of the object with one or more additional inanimate objects, wherein the second information comprises information about an object personality of a particular object of the one or more additional inanimate objects with which the object interacts;

obtaining third information about the object over the first period, wherein the third information is generated by a sensor in proximity to the object;

comparing the first information to usage factors;

comparing the second information to interaction factors;

comparing the third information to environmental factors;

based on the comparing, scoring the first information, second information and third information on a personality scale; and based on the scoring, assigning a personality to the object.

9. The computer readable storage medium of claim 8, the operations further comprising based on the personality of the object, assigning audio to the object.

10. The computer readable storage medium of claim 8, the operations further comprising based on the personality of the object, automatically posting information associated with the personality of the object.

11. The computer readable storage medium of claim 8, the operations further comprising based on the personality of the object, sending a request to post information about the object to social media.

12. The computer readable storage medium of claim 8, wherein the personality comprises introversion; and based on the personality, sending a reduced number of alerts associated with the object.

13. The computer readable storage medium of claim 8, wherein assigning the personality to the object comprises assigning an avatar to the object, the operations further comprising providing instructions to display the avatar via augmented reality.

14. The computer readable storage medium of claim 8, wherein the first information about the object over the first period is from a camera in proximity.

15. A system comprising:

a mobile device; and a network device communicatively connected with the mobile device, the network device comprising:

a processor; and a memory coupled with the processor, the memory storing executable instructions that when executed by the processor cause the processor to effectuate operations comprising:

receiving, at the network device, registration information from an object to be assigned a personality;

creating, by the network device, a profile for the object, the profile comprising descriptive information about the object, the descriptive information comprising identification information and manufacture information;

obtaining first information about the object over a first period wherein the first information comprises information generated by the object, wherein the first information is obtained from the object, the first information comprising information about events detected by the object during an operation of the object, the first information comprising information about a usage of the object or information about a usage of resources by the object;

obtaining second information about the object over the first period, wherein the second information comprises interactions of the object with one or more additional inanimate objects, wherein the second information comprises information about an object personality of a particular object of the one or more additional inanimate objects with which the object interacts;

obtaining third information about the object over the first period, wherein the third information is generated by a sensor in proximity to the object;

comparing the first information to usage factors;

comparing the second information to interaction factors;

comparing the third information to environmental factors that are linked to thresholds for a personality;

based on the comparing, scoring the first information, second information and third information on a personality scale;

based on the scoring, assigning the personality to the object; and based on the personality of the object, assigning an avatar to the object according to the profile.

16. The system of claim 15, the operations further comprising based on the personality of the object, assigning audio to the object.

17. The system of claim 15, the operations further comprising based on the personality of the object, automatically posting information associated with the personality of the object.

18. The system of claim 15, the operations further comprising based on the personality of the object, sending a request to post information about the object to social media according to the profile.

19. The system of claim 15, wherein the personality comprises introversion; and based on the personality, sending a reduced number of alerts associated with the object.

20. The system of claim 15, the operations further comprising providing instructions to display the avatar via augmented reality.

* * * * *